UNITED STATES PATENT OFFICE.

ABRAHAM WIJNBERG, OF AMSTERDAM, NETHERLANDS, ASSIGNOR TO NAAMLOOZE VENNOOTSCHAP "NORIT" WITSUIKER MAATSCHAPPIJ (COMMONLY KNOWN AS NORIT WHITE SUGAR COMPANY), OF AMSTERDAM, NETHERLANDS.

METHOD OF RENDERING SUGAR JUICES AND SOLUTIONS READILY FILTRABLE.

1,176,999. Specification of Letters Patent. Patented Mar. 28, 1916.

No Drawing. Application filed December 3, 1915. Serial No. 64,915.

*To all whom it may concern:*

Be it known that I, ABRAHAM WIJNBERG, a subject of the Queen of the Netherlands, residing at Amsterdam, in Netherlands, have invented certain new and useful Improvements in Methods of Rendering Sugar Juices and Solutions Readily Filtrable, of which the following is a specification.

This invention relates to a new and improved method of rendering sugar cane juice and sugar beet juice and also other solutions of cane sugar and beet sugar more easily filterable than by the methods at present in use.

It is known that in the production and refining especially of cane sugar from cane juices and other cane sugar solutions one of the great difficulties is the fact that said juices and solutions are extremely difficult to filter, in some cases it is nearly impossible to filter them at all. Not only defecated cane juice shows this difficulty to a great extent, but also solutions of cane sugar of high purity. For this reason the cane sugar refineries mostly use the well known "Taylor" filters which have an enormous filtering surface. The installation of these filters causes considerable expense and are objectionable on account of the large space required, great use of steam, washwater and cloth, extensive loss of sugar and high operating expenses. Again, in some raw cane sugar factories, filters of the type mentioned have been installed for filtering the cane juice and effort has also been made to overcome the above-mentioned difficulty of filtration by using large plate and frame filter-press batteries. The cause of the extreme difficulty of filtration is due to the presence of pectins and gums, which are present to a large extent in the juice or sugar solutions as a jelly or in a colloidal state. On filtration by filter presses or filters these bodies clog the pores of the filtercloth, which becomes covered by a thin impenetrable layer of a slimy mass, preventing the passage of the sugar solution or sugar juices. Many different schemes have been tried to improve the filtration of juices and solutions of cane sugar, but no satisfactory method has heretofore been found. Beet sugar solutions and sugar beet juices are more easily filtered than cane sugar solutions or sugar cane juices but also here an improvement to increase the rate of filtration is important.

The present invention consists in the use of decolorizing carbon for the purpose of effecting the easy filtration of neutral, acid or alkaline cane sugar or beet sugar solutions or juices. It is only necessary to add small quantities of the decolorizing carbon to the juices or solutions *i. e.* an amount equal to 0.5 to 1 per cent. of the sugar content. I do not restrict myself to the limits given of 0.5 per cent. to 1.0 per cent., as the desired result can be obtained if larger quantities than 1.0 per cent. are added.

By the use of my invention the required amount of filtering surface (*e. g.* filter cloth) is enormously reduced so that only a few plate and frame presses are necessary. The cakes formed in the presses are easily washed out till free of sugar and little washwater is required therefor. Thus there is a great saving in plant, in cloth, in steam, in washwater, in labor and the sugar losses are greatly reduced.

Decolorizing carbon is a general technical name for a special class of carbon with special physical properties and is quite different from vegetable charcoal, *e. g.* wood charcoal or from bone-black. Decolorizing carbon is a technically pure amorphous carbon and not a compound of carbon like ordinary vegetable charcoal. It has a lower specific gravity and a deeper black color than vegetable charcoal. Decolorizing carbon as it is put on the market contains about 90 per cent. and more of pure carbon.

Vegetable charcoal is a compound of carbon with hydrogen and oxygen and it is a technical name given to a product made by the dry distillation (carbonizing) of wood. It contains about 80 per cent. of the compound with hydrogen and oxygen.

Boneblack, the usual form of animal charcoal, is a name given to a product made by heating bones, in the absence of air. Boneblack only contains about 8 per cent. to 12 per cent. of a carbonaceous matter containing nitrogen. This carbonaceous matter (about 10 per cent. of nitrogen based on the weight of carbon) is the active and valuable substance in bone black.

Decolorizing carbon can be produced in different well known ways. For instance by subjecting vegetable substances during the carbonization and transformation into carbon in closed retorts (or by subjecting vegetable substances already converted into carbon) to a treatment of hot or heated gases such as ammonia, superheated steam chlorin and the like, whereby the vegetable substances by the combined action of heat and of the gases employed, is transformed into decolorizing carbon.

The well known makes of decolorizing carbon which are at present to be found on the market under the registered trade marks "Norit" and "Eponit" are suitable for use in accordance with my invention. "Noir Epure" is also a general trade name for decolorizing carbon but it is not a registered trade-mark. The decolorizing carbon sold under this trade name is likewise suitable for use in accordance with my invention.

As appears from the specification of English Patent No. 21,204/1911, and English Patent No. 11,860/1912, granted to myself and another jointly, the use of decolorizing carbon is known for the purpose of decolorizing more or less completely slightly acidified sugar juices to make refined sugar. Entire decolorization is obtained only by using relatively large quantities of decolorizing carbon. If the sugar juices or solutions are neutral or alkaline, complete decolorization can not be obtained. To obtain a good filtration of sugar juices or solutions in accordance with my invention in slightly acid solutions, the necessary quantity of carbon required is much less than is needed for decolorization. The explanation probably lies in the fact that decolorizing carbon very easily absorbs the gums, pectins and slimy bodies but not so easily the coloring matter so that the solutions or juices are freed from the former and therefore become more suitable for filtration.

The effect of my invention is in most cases the more striking since a very small quantity of decolorizing carbon makes a most obstinate sugar solution or sugar juice suddenly suitable for filtration. The explanation is that although the quantity of pectins, etc., are relatively rather small, they are notwithstanding able, owing to their special physical properties, to make the sugar solutions or sugar juices very difficult to filter by the known methods.

During a test of this invention in a sugar refinery it was found that while a particular cane sugar solution of a purity of about 98 per cent. could only with great difficulty be filtered through an ordinary filter press without using certain flocculating agents and then only with much loss of sugar and loss of time, this same solution was filtered easily after an addition of only 1 kg. of decolorizing carbon to 1000 kg. of the sugar solution. The difficulty of the nonformation of cakes in the presses also disappeared, and after the press had run several hours at a stretch and then opened, it was found that hard well formed cakes were present in the frames. The washing of the filter-cloths also appeared to be totally unnecessary, and the presses were used for several days without changing the cloths.

The following statistics based on the treatment of 100 tons of a cane sugar of 96 polarization, in a solution at about 95° centigrade, illustrate the advantages of my invention over known methods. (a) When no agents capable of improving the filtration were added, 60,000 square feet of cloth filtering surface were required. (b) When chemicals such as kieselguhr, phosphate of lime, etc. (about 1 per cent. on the weight of sugar) were added, 40,000 square feet of the cloth filtering surface were required. (c) When vegetable charcoal (about 1 per cent. on the weight of sugar) was added, 40,000 square feet of cloth filtering surface were required. (d) When decolorizing carbon (about 1 per cent. on the weight of sugar) was added only 1,000 square feet of the cloth filtering surface were required.

In practice the decolorizing carbon may be added to the sugar-containing solutions or juices at any temperature, but preferably it is added at high temperature, viz. at about the boiling point, and preferably while stirring. The sugar juices or sugar containing solutions are preferably heated during the mixing with the decolorizing carbon and are then filtered through suitable filter-cloth in open or closed filters of any type or in filterpresses of any kind, but preferably by pumping through ordinary plate and frame presses. The cakes formed in the filters or presses are washed out with hot or cold water or steam or by any other suitable manner to extract the sugar. The washwater remains pure as practically none of the absorbed substances, except the sugar, are extracted from the decolorizing carbon by washing out with water. The washwater can therefore be used at once for dissolving sugar in sugar refinery practice.

The quantity of decolorizing carbon required to be added for the purpose of the invention depends on the amount and nature of the impurities in the sugar-containing solutions to be treated, and usually varies between say 0.5 and 1 per cent. (of the weight of sugar in the solutions or sugar juices). As before stated I do not restrict myself to the limits given. With very viscous juices, for instance, from unripe cane or from frozen beets a larger quantity of decolorizing carbon would naturally be used than with normal juices from ripe and healthy cane or beets while also a cane sugar or beet-sugar solution of high purity requires less than a cane-sugar or beet-sugar solution of lower purity.

The used decolorizing carbon which has been washed out till free from sugar, and which contains the gums and other slimy matter can be revivified by boiling same with a solution of caustic soda, sodium-carbonate or other like alkalis. For instance it may be boiled with a caustic soda solution of a strength varying between 1 per cent. and 10 per cent. according to the kind of sugar or juice with which the decolorizing carbon has been used, for five minutes to an hour (depending on how large an amount of impurities has been absorbed by the decolorizing carbon). The mixture of decolorizing carbon and soda may then be pumped and filtered and washed out with hot or cold water (preferably hot) until nearly neutral. After partly washing, some hydrochloric acid (about one part of acid to 500 parts of water), is added to the wash water, to neutralize the last traces of alkalinity left in the decolorizing carbon. The hydrochloric acid wash is followed by a washing water (preferably hot) to remove the acid. The decolorizing carbon can then be used again for filtering purposes as described in this specification.

Sometimes a boiling with hydrochloric acid previous to the soda boiling or after the soda boiling is required to remove the inorganic salts and substances. The decolorizing carbon is for instance for this purpose placed in a vat provided with stirrers and stirring gear and a steam coil and boiled with a hydrochloric acid solution of 2 per cent. strength (or more or less) for 5 minutes to an hour. The mixture of decolorizing carbon and acid is then diluted with much water and pumped through plate and frame presses and washed out with hot water until neutral. Sometimes also reburning in a suitable furnace is required in the absence of air, to carbonize the absorbed organic matter which has not been removed by the treatment with soda and hydrochloric acid and to remove the fibrous and other matters which were in suspension in the sugar solution and which were filtered off with the decolorizing carbon.

What I claim is:—

1. A method of treating sugar solutions containing impurities which have the effect of materially impeding filtration thereof, said method comprising the step of adding to such solutions, an amount of "decolorizing carbon" capable of absorbing a material amount of said impurities.

2. A method of treating sugar solutions containing impurities which have the effect of materially impeding filtration thereof, said method comprising the step of adding to such solutions, an amount of "decolorizing carbon" less than that required for total decolorization of said sugar solutions.

3. A method of treating sugar solutions containing impurities which have the effect of materially impeding filtration thereof, said method comprising the step of adding to such solutions while hot, an amount of "decolorizing carbon" capable of absorbing a material amount of said impurities.

4. A method of treating sugar solutions containing impurities which have the effect of materially impeding filtration thereof, said method comprising the step of adding to such solutions an amount of "decolorizing carbon" equal to about 0.5 to 1% of the weight of the sugar contained therein.

In witness whereof I have signed this specification in the presence of two witnesses.

Dr. ABRAHAM WIJNBERG.

Witnesses:
P. H. Proost,
D. Kliyn.